United States Patent
Benjes et al.

(10) Patent No.: US 7,587,705 B2
(45) Date of Patent: *Sep. 8, 2009

(54) CALLS AND RETURN CALLS USING CLIENT INTERFACES

(75) Inventors: Friederike Benjes, Heidelberg (DE); Andreas Blumenthal, Heidelberg (DE); Thomas Decker, Langenbrücken (DE); Rasmus Faust, Heidelberg (DE); Markus Frick, Karslruhe (DE); Gerd Kluger, Sinsheim (DE); Ulrich Koch, Heidelberg (DE); Helmut Prestel, Bad Schönborn (DE); Juergen Remmel, Muehlhausen (DE); Martin Runte, Darmstadt Hesse (DE); Andreas Simon Schmitt, Kaiserslautern (DE); Michael Schneider, Walldorf (DE)

(73) Assignee: SAP (AG), Walldorf (DE)

( * ) Notice: Subject to any disclaimer, the term of this patent is extended or adjusted under 35 U.S.C. 154(b) by 819 days.

This patent is subject to a terminal disclaimer.

(21) Appl. No.: 11/118,739

(22) Filed: Apr. 29, 2005

(65) Prior Publication Data

US 2006/0248545 A1 Nov. 2, 2006

(51) Int. Cl.
G06F 9/44 (2006.01)
G06F 15/16 (2006.01)

(52) U.S. Cl. .................... 717/103; 717/108; 709/202; 709/203

(58) Field of Classification Search .............. 717/103
See application file for complete search history.

(56) References Cited

U.S. PATENT DOCUMENTS

| 5,287,507 | A | | 2/1994 | Hamilton et al. | |
|---|---|---|---|---|---|
| 5,307,490 | A | * | 4/1994 | Davidson et al. | 719/328 |
| 5,548,726 | A | * | 8/1996 | Pettus | 709/221 |
| 5,754,841 | A | | 5/1998 | Carino, Jr. | |
| 5,764,897 | A | | 6/1998 | Khalidi | |
| 5,793,965 | A | | 8/1998 | Vanderbilt et al. | |
| 5,802,367 | A | * | 9/1998 | Held et al. | 719/332 |
| 5,872,973 | A | * | 2/1999 | Mitchell et al. | 719/332 |
| 5,884,316 | A | | 3/1999 | Bernstein et al. | |
| 5,950,010 | A | | 9/1999 | Hesse et al. | |
| 6,016,496 | A | | 1/2000 | Roberson | |
| 6,038,590 | A | | 3/2000 | Gish | |

(Continued)

FOREIGN PATENT DOCUMENTS

| JP | 07295929 | | 11/1995 |
|---|---|---|---|
| JP | 07295929 | A * | 11/1995 |

OTHER PUBLICATIONS

Waldo, J., "Remote procedure calls and Java Remote Method Invocation," Concurrency, IEEE , vol. 6, No. 3, pp. 5-7, Jul.-Sep. 1998.*
Author Unknown, "Using RMI with Client-Side Callbacks", Aug. 29, 2000, BEA Systems Inc., accessed Feb. 9, 2009 from http://web.archive.org/web/20000829110606/http://edocs.bea.com/wle/rmi/callbak.htm#1023769.*
Tzi-cker Chiueh; Pilania, D., "Design, Implementation, and Evaluation of a Repairable Database Management System," Data Engineering, 2005. ICDE 2005. Proceedings. 21st International Conference on, pp. 1024-1035, Apr. 5-8, 2005.*

(Continued)

*Primary Examiner*—James Rutten
(74) *Attorney, Agent, or Firm*—Blakely, Sokoloff, Taylor & Zafman, LLP

(57) ABSTRACT

A method and system for executing calls and return calls using client interfaces for packages. In one embodiment, a service at a service package is called using a client interface at a client package. The return call is then made on object using the client interface at the client package as performed by the service at the service package.

12 Claims, 12 Drawing Sheets

U.S. PATENT DOCUMENTS

| | | | |
|---|---|---|---|
| 6,043,837 A | | 3/2000 | Driscoll, Jr. et al. |
| 6,101,528 A | | 8/2000 | Butt |
| 6,102,965 A | * | 8/2000 | Dye et al. .................... 717/109 |
| 6,125,383 A | * | 9/2000 | Glynias et al. .............. 709/202 |
| 6,134,603 A | | 10/2000 | Jones et al. |
| 6,223,217 B1 | | 4/2001 | Pettus |
| 6,236,999 B1 | * | 5/2001 | Jacobs et al. ................. 707/10 |
| 6,314,468 B1 | | 11/2001 | Murphy et al. |
| 7,017,014 B2 | | 3/2006 | Cuomo et al. |
| 7,047,518 B2 | | 5/2006 | Little et al. |
| 7,076,784 B1 | | 7/2006 | Russell et al. |
| 2001/0013050 A1 | * | 8/2001 | Shah .......................... 709/202 |
| 2001/0055303 A1 | | 12/2001 | Horton et al. |
| 2002/0035591 A1 | * | 3/2002 | Kimura ..................... 709/200 |
| 2003/0009754 A1 | | 1/2003 | Rowley et al. |
| 2003/0033191 A1 | | 2/2003 | Davies et al. |
| 2005/0010919 A1 | | 1/2005 | Ramanathan et al. |
| 2005/0108704 A1 | | 5/2005 | Marinelli et al. |
| 2005/0155042 A1 | * | 7/2005 | Kolb et al. .................. 719/318 |
| 2005/0256933 A1 | * | 11/2005 | Millington et al. .......... 709/207 |
| 2007/0234290 A1 | | 10/2007 | Ronen et al. |

OTHER PUBLICATIONS

Finkelstein, et al., ""Software Package Requirements & Procurement"", *IEEE, Proceedings of 8th International Workshop on Software Specification and Design*, (1996), pp. 141-145.

Suleman, et al., ""A Flexible Approach to Web Component Packaging"", *SAICSIT*, (2006), 257-266.

Tom, Lunney, et al., ""Object Persistence in Java"", *PPPJ*, (2003), pp. 115-120.

Final Office Action for U.S. Appl. No. 11/118,560, Mailed Feb. 17, 2009, 14 pages.

* cited by examiner

CALLS AND RETURN CALLS USING CLIENT INTERFACES

TECHNICAL FIELD

Embodiments of the invention generally relate to the field of data processing systems and, more particularly, to a system and method for executing calls and return calls using client interfaces for packages.

BACKGROUND

As application development projects grow larger, packages are becoming both increasingly important and cumbersome. For example, when changes are made to currently existing Advanced Business Application Programming™ (ABAP) software, the implication of such changes are difficult to foresee, which often causes problems in the future. Having an improved package can make the software's blueprint visible, which can make the changes to the software foreseeable and better protected against malicious changes.

FIG. 1 illustrates a prior art package 100. The package 100 is also known as development classes because it represents a group of objects 102, where each object 102 is assigned to a development class. Each development object 102, such as report, global class, data element, and table, is assigned to the package 100. The object 102 contains organizational attributes, such as person responsible, application component, etc., and technical attributes, such as transport layers, software component, etc. The package 100 also includes a package interface 104 to expose the object 102 to those who seek the object 102.

The package 100 is viewed as a capsule whose content is hidden to the outside. Any interaction with the package's content is accomplished through the development objects 102 that are exposed via an interface 104 of the respective package 100. Furthermore, the package 100 determines transport properties of development object 102 contained in it, such as whether the object 102 can be exported from the system, or whether it can be exported, and what are the target systems (using the assignment to a transport layer).

Referring now to FIG. 2, it illustrates nesting 200 of multiple packages 202, 208. As illustrated, a package 208 (e.g., subpackage) is nested into another package 202 (e.g., superpackage). When nesting 200, the subpackage 208 is visible only within its superpackage 202. This package nesting 200, for example, allows for structuring of packages 202, 208 by placing the development objects 210 needed only for a certain part of the implementation into a separate subpackage 208. The superpackage 202 not only exposes its own development objects 204 via its interface 206, but also exposes the objects 210 of its subpackage 208 through the subpackage's interface 212 and its own interface 206. Those development objects of the subpackage 208 that are not exposed at the superpackage's interface 206 are invisible outside the superpackage 202 and can only be used from within the superpackage 202.

Although the conventional package mechanism provides increasing flexibility for better structuring of software, and represents an essential tool for ensuring and tracking decoupling of software, further improvements to the existing package mechanism are needed. For example, the conventional package mechanism lacks new strategies with regard to handling generation of objects, interfacing, and enhancements to software. These limitations are further exasperated when different interfaces, modules, components, and/or services are used across the development project.

SUMMARY

A method and system for executing calls and return calls using client interfaces for packages. In one embodiment, a service at a service package is called using a client interface at a client package. The return call is then made on object using the client interface at the client package as performed by the service at the service package.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1:
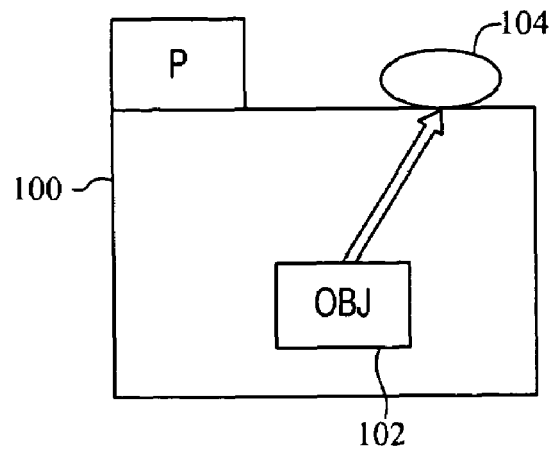
FIG. 1 illustrates a prior art package.
Figure 2:
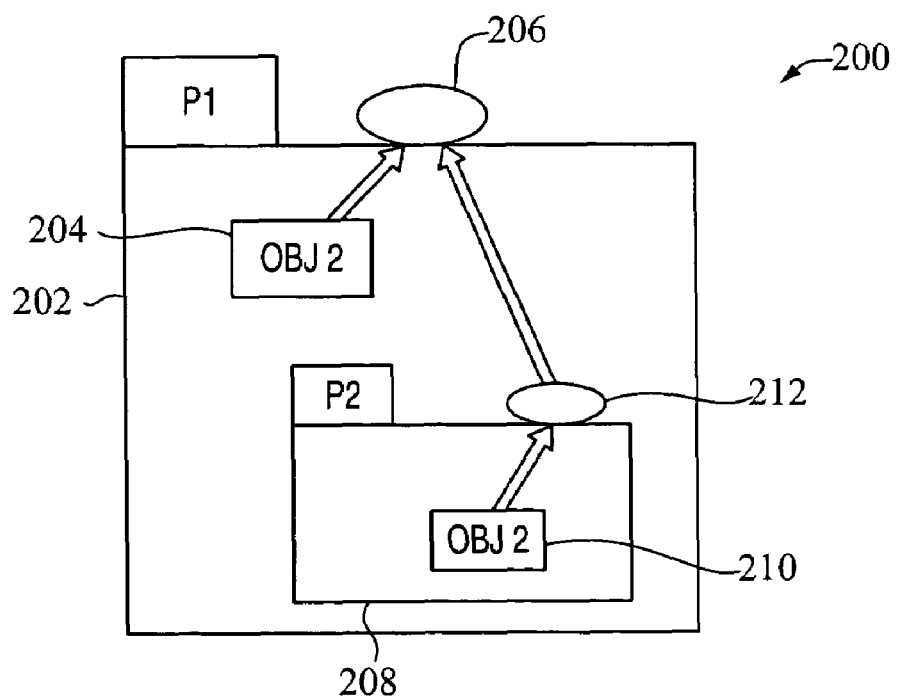
FIG. 2 illustrates a prior art nesting of multiple packages.

Described below is a system and method for executing calls and return calls using client interfaces for packages. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), Digital Video Disk ROM (DVD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 3:
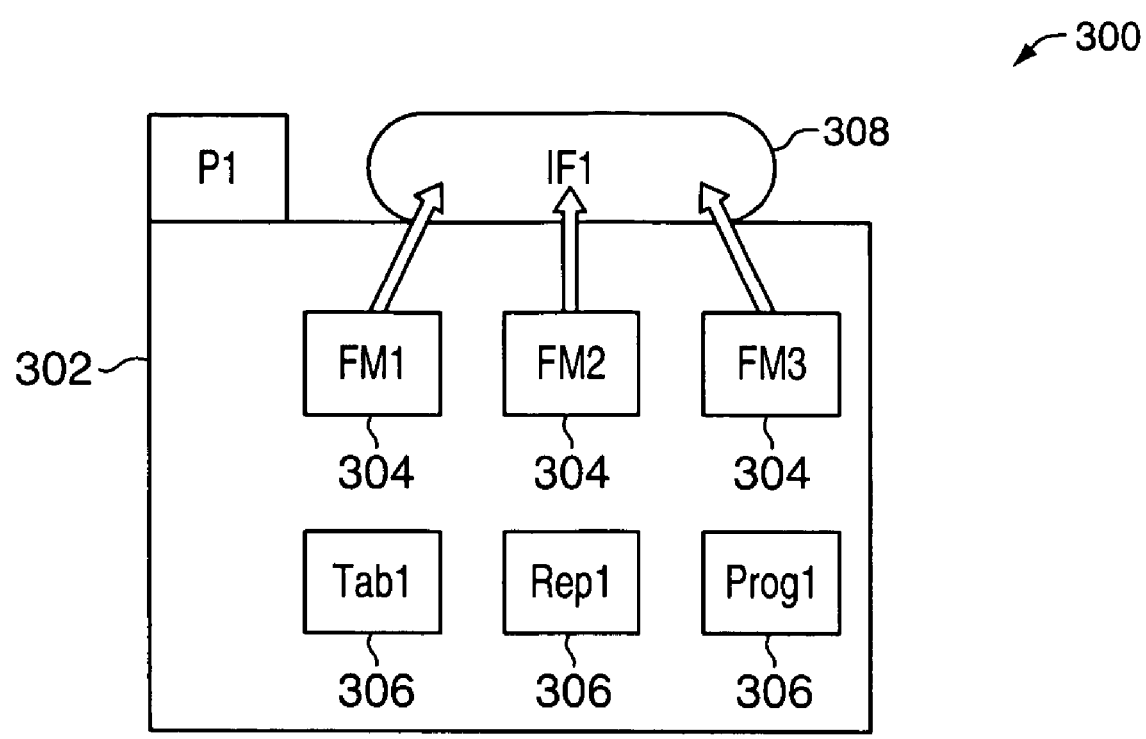
FIG. 3 illustrates a provider package.

FIG. 3 illustrates a provider package 302. A package typically includes a provider package (e.g., server) 302 or a user package (e.g., client). A provider package 302 is to offer services or elements 304-306 (e.g., modules, types, business application programming interfaces (BAPIs), classes, reports, tables, programs, reviews, and the like) to the outside components. These services 304-306 constitute one or more interfaces 308 between the provider package 302 and a user. In the illustrated embodiment, services 304 are visible and exported to the outside components via the interface 308, while services 306 are not visible. The provider package 302 may not know its context and present itself as a black box to the outside and deeper-level inside to increase locality and independence.

Figure 4:
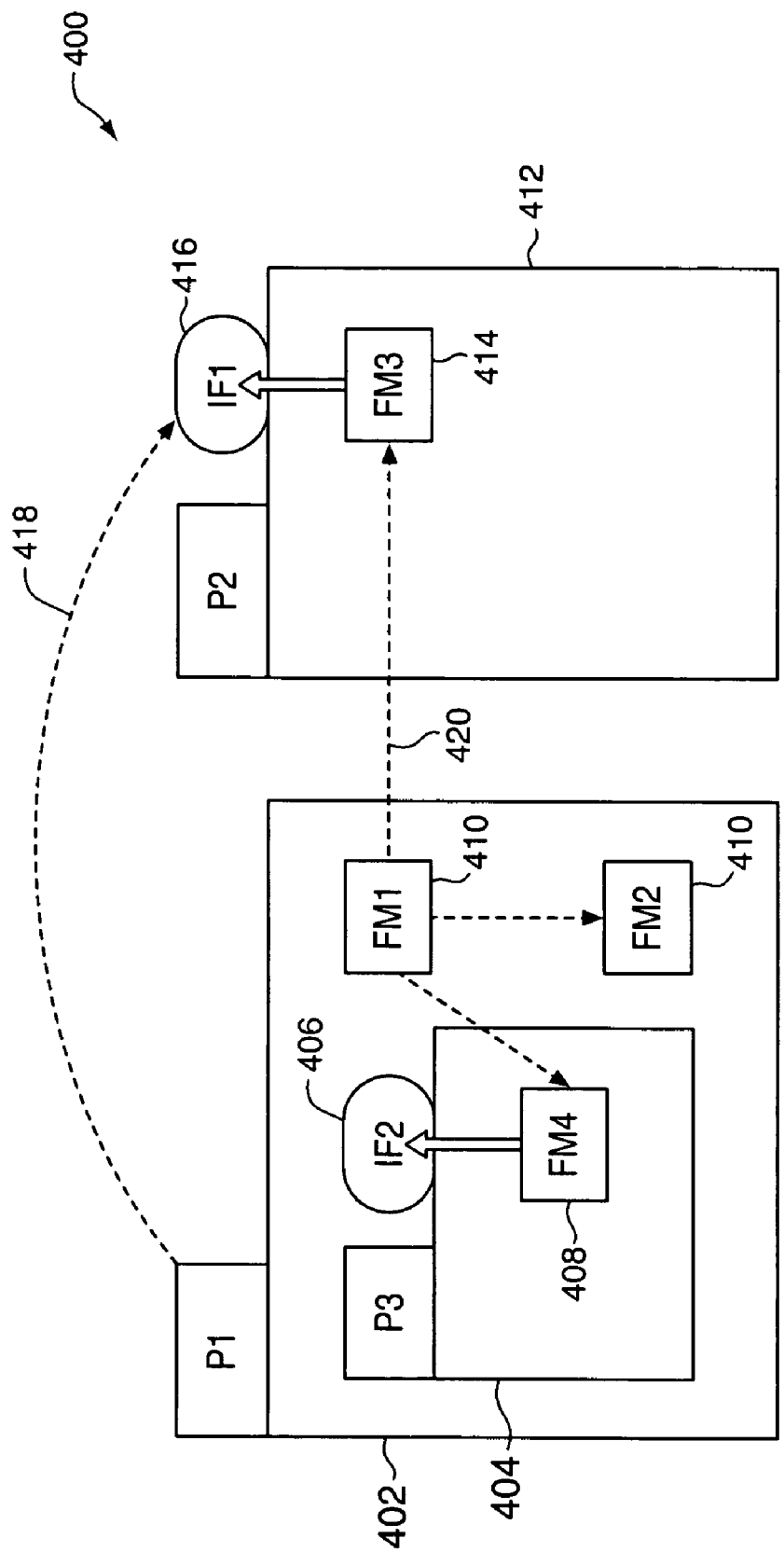
FIG. 4 illustrates user packages.

FIG. 4 illustrates user packages 402, 412. The user package 402 serves as a client using its own internal services 410, internal services 408 at subpackage 404, and external services 414 at user package 412. Internal services 410 (e.g., objects, classes, etc.) include those objects that are in the reference package itself and also include those services 408 that are contained in its subpackage 404. Other services 414 are considered external. The user package 402 also includes an embedded subpackage 404 that includes visible services 408 exposed to the superpackage 402 via the interface 406. The user package 402 can also use visible elements 414 of a parallel user package 412 when having appropriate usage permission 418. For example, the non-visible service 410 can make a call 420 to the visible service 414 at the parallel user package 412.

Figure 5:
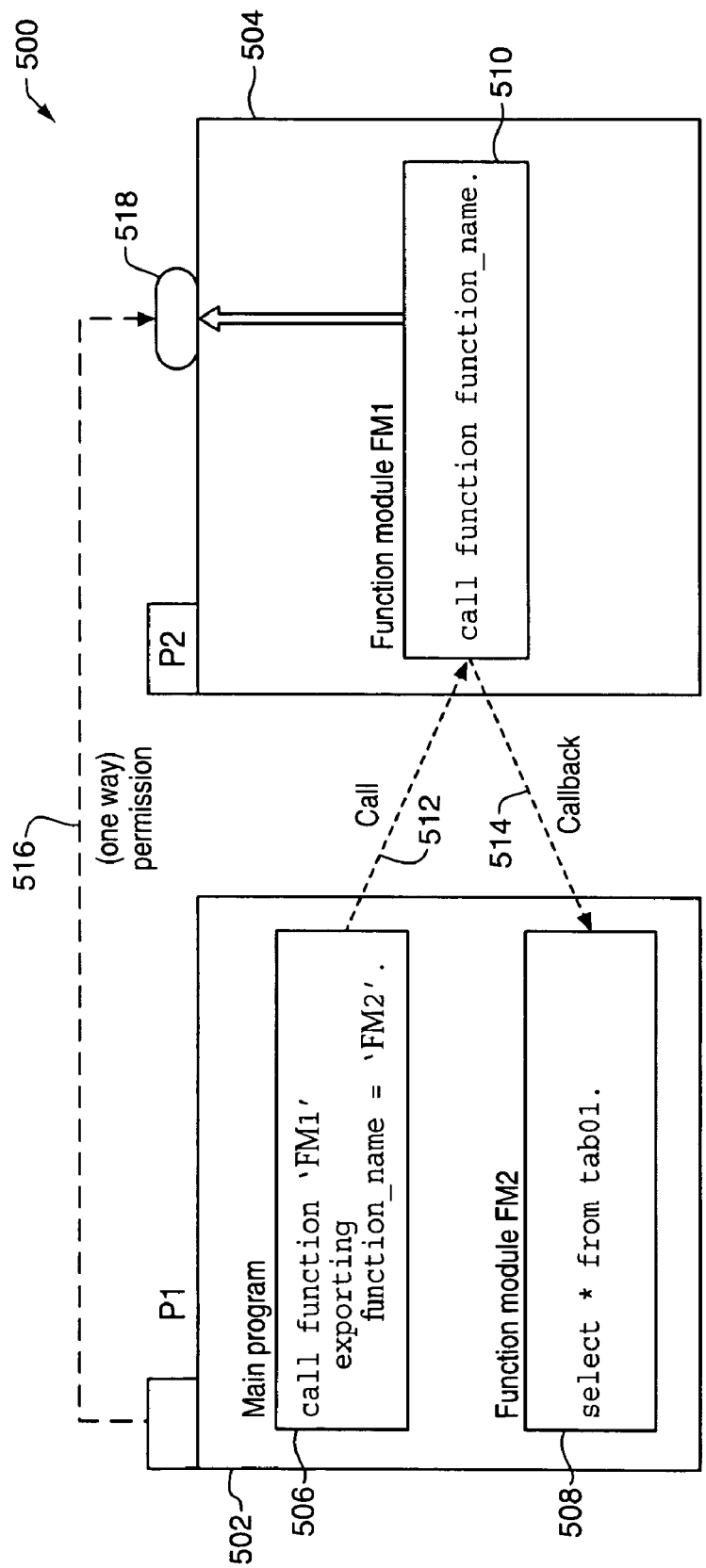
FIG. 5 illustrates an overview of a callback mechanism.

FIG. 5 illustrates an overview of a callback mechanism 500. In most cases, usage can be checked successfully using visibility and usage permission. A few exceptions include where normal checks result in a termination. These are referred to as callback, system programs, and special programs. For example, the illustrated callback mechanism 500 includes two packages P1 502 and P2 504 with package P1 502 having a one-way permission 516 to access package P2 504 via a package interface 518. In case of callbacks, a main program 506 at package P1 502 may call 512 a subroutine 510 (e.g., function module FM1) at package P2 504 and pass the name of a third program 508 (e.g., function module FM2) as a parameter to the subroutine 510. The subroutine 510 at package P2 504 may then dynamically callback 514 the third program 508.

Frequently, the subroutine 510 does not see the third program 508 or no appropriate usage permission exits. To avoid recurring terminations, the subroutine 510 (also known as the package element) is assigned the check scope attribute. This switch has three settings, such as (1) static and dynamic usage (e.g., calls) is checked, (2) static usage is checked, while dynamic is not, and (3) static and dynamic usage is not checked. Other exceptions are system and special programs. These programs use a large number of development objects from various packages without appropriate visibilities or usage permissions being available. A practical example is the translation tool. The tool dynamically reads text and documentation in the original language from various tables (e.g., for data elements, messages, and screens) and dynamically inserts these texts into the table in the target language.

Figure 6:
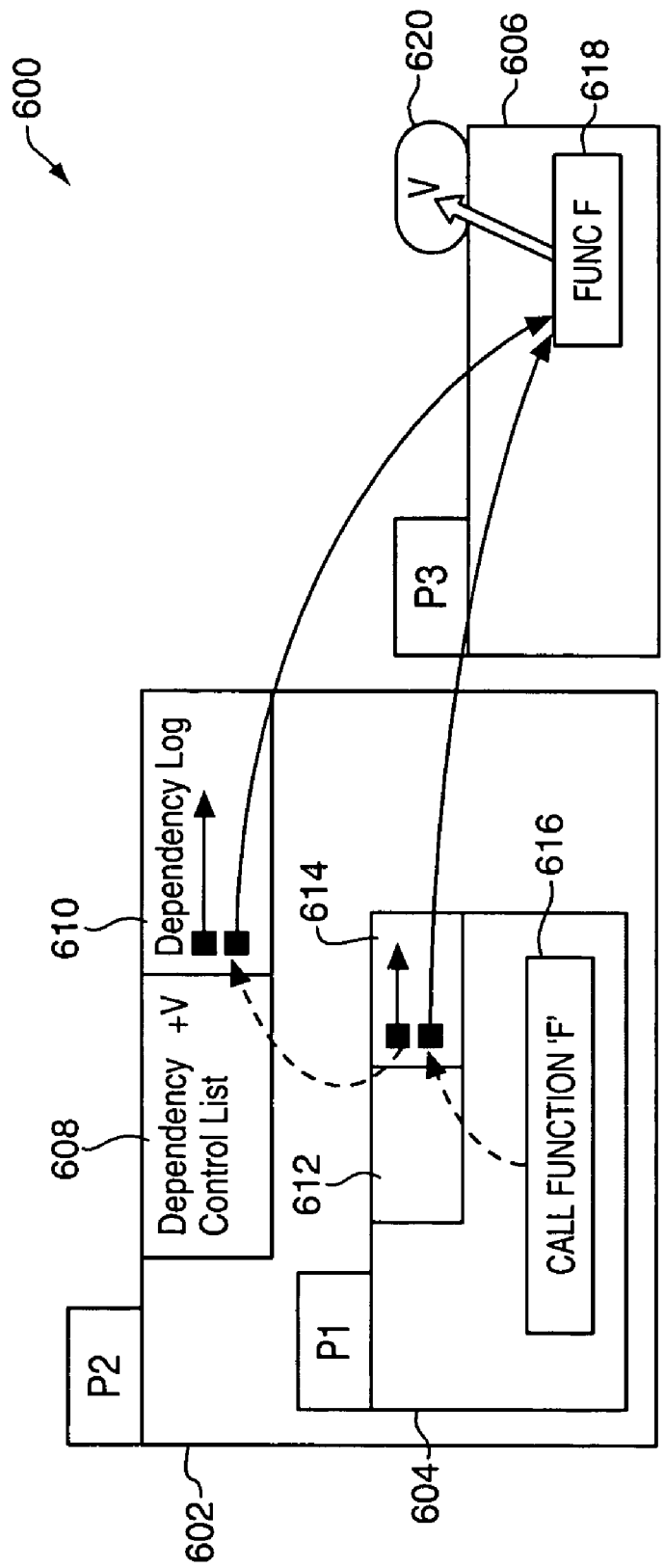
FIG. 6 illustrates an embodiment of dependency control lists and dependency logs.

FIG. 6 illustrates an embodiment of dependency control lists 608, 612 and dependency logs 610, 614. In one embodiment, both aspects, dependency control and dependency log, are treated separately. For example, the permission to use an object 618 is determined through dependency control lists 608, 612, and for each package 602 there is a dependency log 610 of objects used by the superpackage 602 and its subpackages 604. The dependency log 610 is capable of covering both the static and dynamic uses.

In the illustrated embodiment, using the dependency control list 608, package P2 602 allows the use of interface V 620 at package P3 606. Also, using the dependency control list 608 at package P2 602, the function module F 618 can be called 616. Package P1 604 may also have a dependency control list 612 which inherits the dependency control list 608 at package P2 602 (i.e., the dependency control list 612, implicitly, having the same entries as those of the dependency control list 608 without adding its own). The dependency log 610 of package P2 602 is updated whenever the program (e.g., reports, classes, etc.) that contains the call function statement to invoke function module F is inserted back into the running system after having been modified.

A dependency control list 608, 612 represents a list of external, visible interfaces. Further, objects contained in the interfaces listed in these dependency control lists 608, 612 can be used by objects of the superpackage 602 and its subpackages 604. A dependency control list 608, 612 may be represented through an inclusion list and an exclusion list, where both of these lists, external, visible interfaces and external, visible interface lists can be included. The entries in both lists may depend on the following: (1) to the content of the reference package 602, without a subpackage 604; (2) to the content of the reference package 602 and the subpackage 604; and to the content of the subpackage 604, without the content of the reference package 602. For example, a package may allow a specific subpackage to access a specific interface, etc., which means the dependency control list allows not only to specify which interfaces can be used, but also who can use them. It is, however, contemplated that more than two packages may be employed which could lead to several additional possible combinations than the three list here.

The dependency control lists 608, 612 are used in controlling access to certain interfaces. For example, (1) in a relevant inclusion list, there may not be an entry valid for the client package, such as package P2 602, available for the respective interfaces 620, in which case the use of the interfaces 620 by the client package 602 may not occur; (2) in a relevant exclusion list, a valid, active entry for the client package 602 may exist for the respective interfaces 620, in which case, the use of the interface 620 may not occur; and (3) in a relevant exclusion list, a valid, non-active entry for the client package 602 exists for the respective interface 620, which allows the use of the interfaces 620. In one embodiment, the use of the interface 620 is defined by the dependency control lists 608, 612 and allowed within the framework of the limitations as set forth in the dependency control lists 608, 612. For clarification, the term "non-active entries" refers to entries serving for backward compatibility and migration of existing coding, such as expressing non-approval of a particular interface anymore, but that the uses of that interface have not yet been removed from the coding. In other words, it is documented that the use is deprecated, but the affected coding continues to work. The term "active entries" refers to real exclusion entries.

Figure 7:
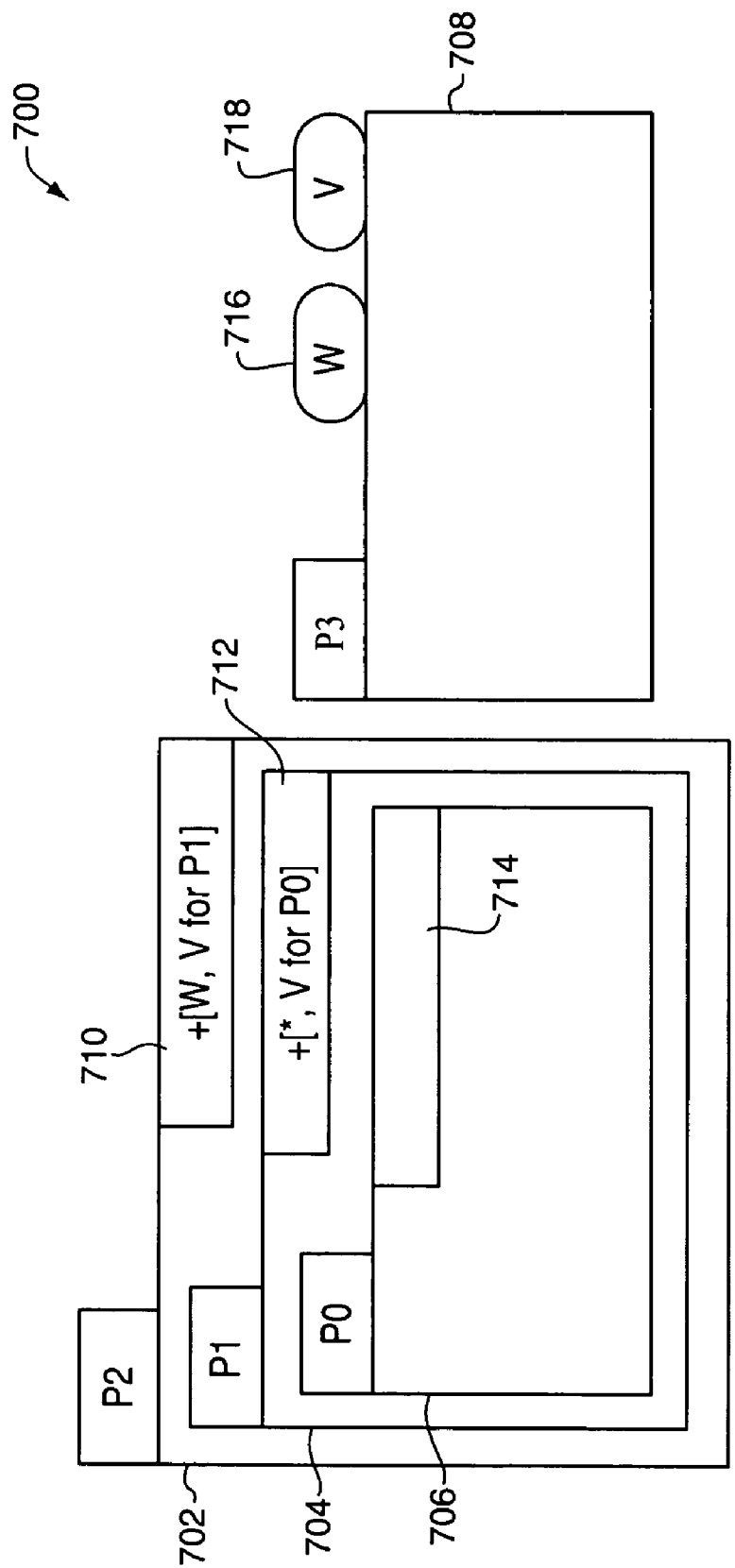
FIG. 7 illustrates an embodiment of dependency control lists.

FIG. 7 illustrates an embodiment of dependency control lists 710-714. In the illustrated embodiment, the dependency control list 710 of package P2 702 allows the use of interfaces W and V 716-718 at package P3 708 for subpackage P1 704. In the dependency control list 712 of package P1 704, the use of the privileges allowed by the dependency control list 710 of the subpackage P2 702, and expressly by interface V 718 is also allowed for subpackage P0 706. The express permission to use interface V 718 may not be necessary since interface V 718 is also covered by the pseudo entry. Further, package P0 706 does not define its own dependency control list 714 and thus inherits the one from package P1 704.

Figure 8:
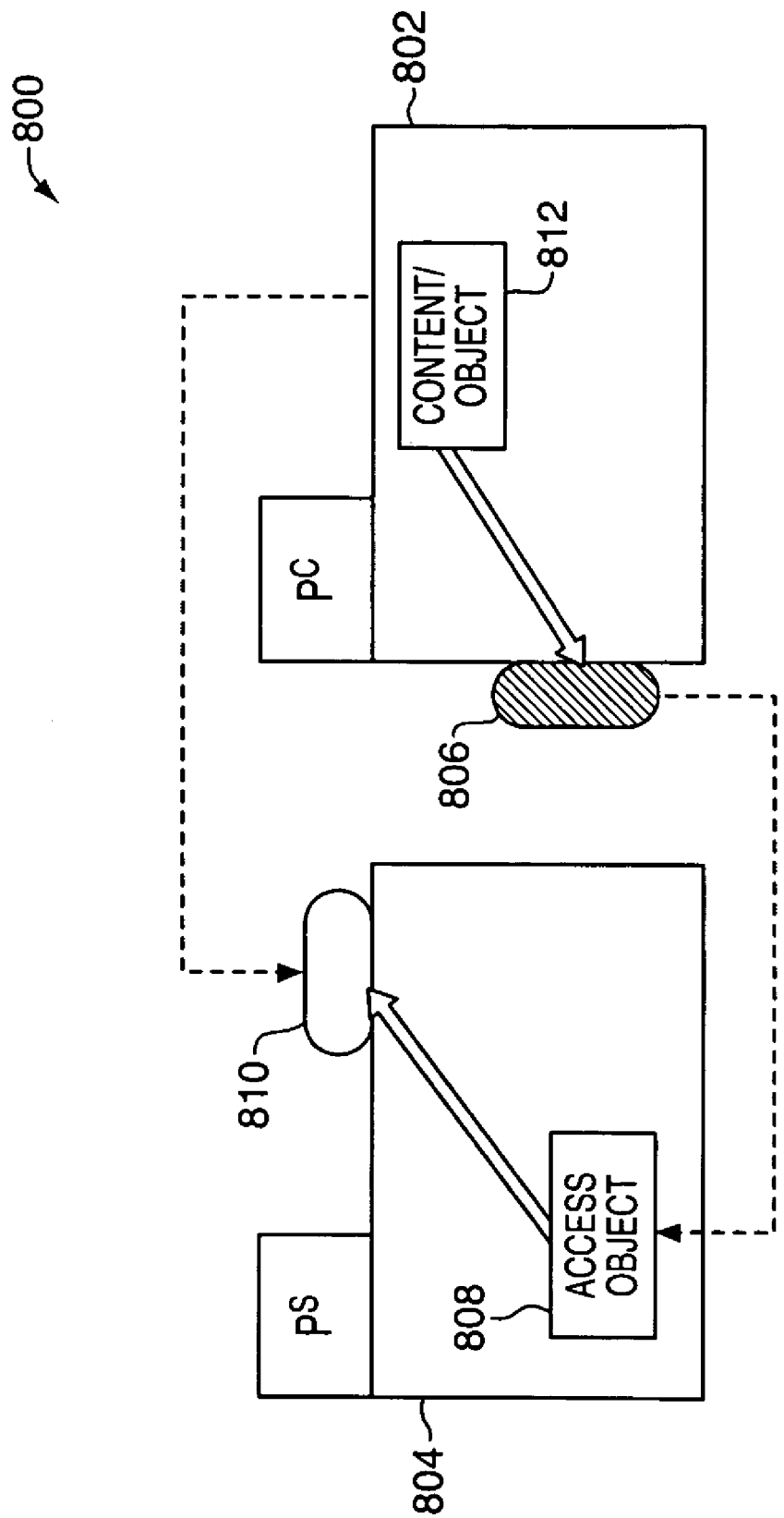
FIG. 8 illustrates an embodiment of a client interface and an access object in a package environment.

FIG. 8 illustrates an embodiment of a client interface 806 and an access object 808 in a package environment 800. If a client package ($P^C$) 802 is to allow access to its content 812 to a particular service, it can set up a client interface 806 labeled with the access object 808 corresponding to the particular service. In one embodiment, a client interface 806 is created for each access object 808 that is exposed in a package interface 810 visible for the client package 802. For setting up the client interface 806, it may not be necessary to have the respective package interface 810 usable for the client package 802. Further, if the client interface 806 is transported to a system in which the access object 808 is not visible for the client package 802, the client interface 806 may be kept, but without having any effect.

In other words, the package 804 (including a superpackage (not shown)) through its dependency control lists do not have the control function to determine for which services the client interface 806 is to be created. Further, using this technique, editors are prevented from having to be included in the dependency lists, such as the editors that are used for processing the respective package content, but are not used directly from the service package 804. Conversely, the direct use (e.g., through calling a function module or a method) of an interface 810 that exposes the access object 808 may be subject to control through the respective dependency control lists. In other words, the weakening of the (normally expected) "usability" of an object in favor of just "visibility" as prerequisite to set up client interfaces 806 is justified as it is undesirable in the case when a special editor (e.g., refactoring tools, normal editor with certain special features necessary for a particular development project) needs to be used editing a package's content. In this case, the edited content does not depend on the editor, that is, it can be executed even if the editor is not available in the system, because making an interface usable by adding an entry to a dependency control list normally implies declaring a dependency (which does not exist in this special case, however), which would not be adequate.

The client interface 806 through a switch can be limited in its effect to the package 802 that defined it. In one embodiment, the client interface 806 is valid for a package 802 and, through "inheritance", for each of its subpackages (not shown), which means the access permissions declared in the client interface 806 are granted not only by the original package 802, but also by its subpackages. For subpackages, just those access permissions are inherited that also "make sense" for the subpackages, which means the access permissions related to internal objects of the declaring package would not take effect for the subpackages. However, generic permissions (e.g., generation/editing access to any object of a certain type) may take effect. Further, the original client interface 802 is linked, copied, and/or propagated (where changes on the original client interface immediately take effect on all copies) to the subpackages. Those parts of the superpackage's dependency control list are inherited by the subpackage that are valid in the subpackage's context as well.

There are ways in which a subpackage can protect itself against editing. For example, having granted access permissions declared in a client interface 806 not only by the original package 802, but also by its subpackages is one way certain subpackages can exclude themselves from being edited. If more objects are to be added to the objects already defined in the superpackage, they can re-use the content of the client interface of the superpackage by entering a special pseudo entry in the interface. Otherwise, the settings of the superpackage are replaced.

In the illustrated embodiment, the client package 802 exposes its object 812 using its client interface 806. The client interface 806 is created using the corresponding access object 808 exposed by the service package 810. The objects at the service package 804 can access the objects 812 at the client package 802 exposed via the client interface 806 using dynamic techniques. For example, a unique access object 808 is assigned to each service that needs to execute return calls to the clients. A client package 802 of the service then creates a client interface 806 at the client package 802 for that access object 808. Using the client interface 806, the client package 802 can then expose the required objects (e.g., FORMs, global variables, etc.) dynamically for this particular service (associated with the access object 808).

In one embodiment, any services at the service package 804 that needs to access objects 812 of its clients exposes an access object 808 in a suitable interface 810 (e.g., in the interface, the use of which necessitates for it to access the client) for its clients. One or more packages can be assigned to an access object 808. These packages contain the implementation of the respective service (e.g., implementation packages). An implementation package can be assigned to no more than a single access object 808.

The client interface 806 consists of a list of objects that are to be exposed for the service concerned, and further includes those objects that are exposed via package interfaces. In other words, anything that can potentially be exposed through package interfaces can potentially be exposed through client interfaces 806, so the set of objects that can potentially be exposed through client interfaces 806 at least contains those objects that can potentially be exposed packages interfaces. The actual package interfaces 806, however, may contain objects that are exposed at any actual client interface 806, and the actual client interface 806 may contain objects that are not exposed at any actual package interface. In the client interface 806, local objects of a program belonging to the client package 802 can also be exposed if they are marked as program-external objects; however, the marking itself does not expose the objects, but it simply enables that these objects may be accessed from other programs, which includes programs of the same package, so that the client interface 806 comes into play in cases when access is necessary across package boundaries. Examples of such objects include: global variables, local classes, and structure types. The client interface 806 is also used to expose the following: function modules of a function group, classes of the client package 802, and any types from other packages that can be used by the client package 802. Furthermore, the client interface 806 can expose other objects or types of objects from the client package 802 (e.g., including dynamically-created types of the package), if these objects at some point in time are related their original package.

In one embodiment, the client interface 806, the access object 808 of the service implemented is exposed. By including the access object 808 into the client interface 806, the service can in turn pass on the usage rights to a second service. For example, if service 1 exposes the access object 808 in a client service to service 2, service 2 can also access those objects that were exposed in the client interface 806 to service 1.

Figure 9:
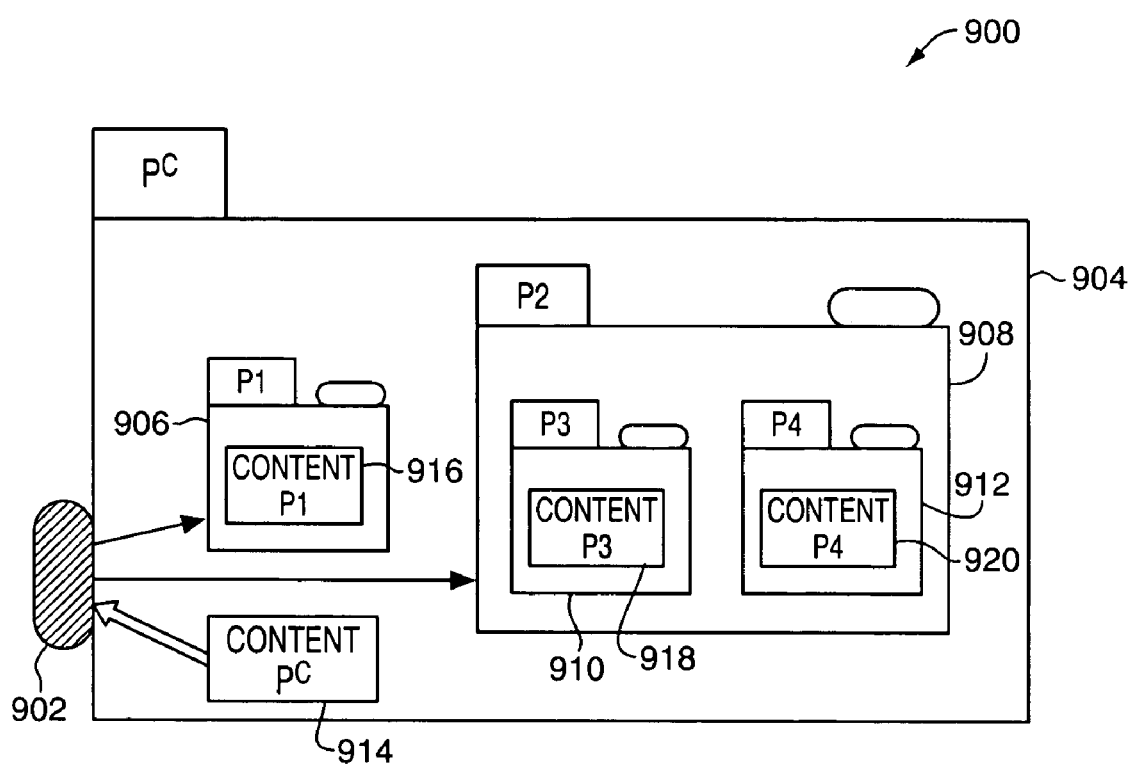
FIG. 9 illustrates an embodiment of a client package providing access using a client interface in a package environment.

FIG. 9 illustrates an embodiment of a client package 904 in a package environment 900. In one embodiment, the client interface 902 is valid for a package 904 and, through "inheritance", for each of its subpackages P1, P2 906, 908, which means the access permissions declared in the client interface 902 are granted not only by the original package 904, but also by its subpackages 906, 908. For subpackages 906, 908, just those access permissions are inherited that also are valid in the context of the subpackages 906, 908. For example, the access permissions related to internal objects of the declaring package would not take effect for the subpackages 906, 908. However, generic permissions (e.g., generation/editing access to any object of a certain type) may take effect.

The illustrated client package 904 is regarded as a superpackage having a number of subpackages 906-912, which include direct subpackages P1 and P2 906, 908 and indirect subpackages P3 and P4 910, 912. The direct subpackages 906-908 are regarded as sibling packages to each other as they share the same superpackage 904. The indirect subpackages 910-912 are also siblings to each other as they share the same superpackage 908, which makes them indirect as they are indirect subpackages of the superpackage 904. Each of the subpackages 906-912 contains its own content 916-920.

Figure 10:
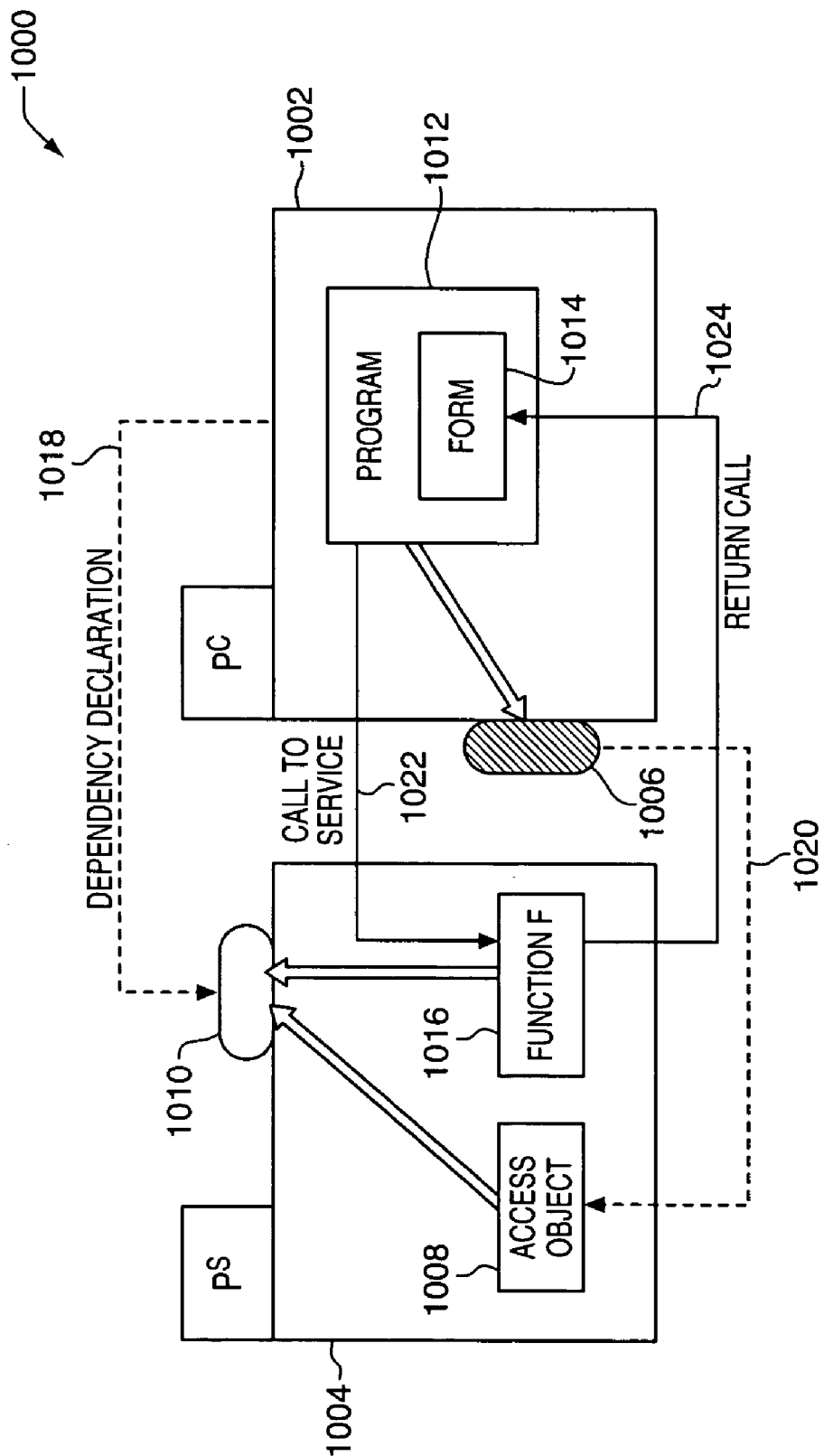
FIG. 10 illustrates an embodiment of executing calls and return calls using a client interface in a package environment.

FIG. 10 illustrates an embodiment of executing calls 1022 and return calls 1024 using a client interface 1006 in a package environment 1000. In the illustrated embodiment, a service package (P$^S$) 1004 is in communication with a client package (P$^C$) 1002. As illustrated, the service package 1004 includes a package interface 1010 that is used to expose the access object 1008 associated with (to identify) a service 1016 (e.g., function F) that the client package 1002 calls 1022 to carry out its recurring tasks, such as displaying data at the front end through the SAP List Viewer (ALV), which is a standard component that is used to display and edit data in tables. The service 1016 is also exposed by the service package 1004 using the package interface 1010.

In one embodiment, the client package 1002 uses the client interface 1006 to expose 1020 the access object 1008 (i.e., referring to the access object 1008). The service 1016 that the client desires is then identified. The access object 1008 is referred to when naming the client interface 1006. The client interface 1006 is used by the client package 1002 to expose its content having objects, such as program 1012 having FORM 1014. However, the client interface 1006 may not be used for declaring the client's 1002 dependency on the service 1016, and that the client interface 1006 can be setup even when dependency lists forbid it. The client package 1002 also uses the dependency declaration 1018 to access the service package 1004 via the package interface 1010. Using the client interface 1006 at the client package 102, various objects can be exposed, such as FORMs 1014, objects that are generally exposed using a package interface, program-local DATA, and other program-local objects. Each client package 1002 can have one client interface 1006 dedicated for a given service 1016, which means one client interface 1006 is provided for one service 1016.

To assign the client interface 1006 to the service 1016, the access object 1008 is used to first identify the service 1016 and then assign the client interface 1006 to that service. To accomplish this, a unique access object 1008 may be assigned to each service 1016 that can be used or is needed to execute return calls 1024 to the client package 1002. The client package 1002 of the service 1016 may then set up the client interface 1006 for that access object 1008. At the client interface 1006, the client package 1002 then exposes the necessary objects 1014 (e.g., FORMs, global variables, etc.) for this particular service 1016.

In the illustrated embodiment, the client package 1002 exposes its content/object (program/FORM) 1012-1014 via the client interface 1006, which is set up for the access object 1008 exposed by the service package 1004. The service (function F) 1016, which is exposed by the service package 1004 at the package interface 1010, is then called 1022 by the client package 1002. Using dynamic techniques, the service 1016 can now return call 1024 and dynamically access the object 1014 exposed via the client interface 1006 at the client package 1002.

The service 1016 includes a function that the client package 1002 can call 1022. The service 1016 also includes a quantity of objects, called service entry points, which are within the service package 1004 and are published using the package interface 1010. It is contemplated that some services 1016 may include objects of their sold-to party, such as the ALV calls back 1024 the client package 1002 if the user has triggered certain actions through the list generated by the ALV. Such implementation actions are provided by the client package 1002. Further, those objects that are needed by a service 1016 are generally not exposed using normal package interfaces 1010, and the service 1016 does not know its clients and is not dependent on them. To appropriately check uses of objects belonging to the client package 1002 through a service 1016, the "onus of proof" is reversed, and the client package 1002 expose its objects 1012-1014 needed by the service 1016 using the client interface 1006. The client interface 1006 maybe used in cases (1) in which the service 1016 calls back 1024 the client package 1002 through FORMs, function modules or constructors, static methods, and the like, from ABAP Objects classes, and (2) in which the service 1016 needs the type of a data object that the client package 1002 has passed to it through a generically-typed parameter. For example, the ALV requires the needed type of a table that is provided for output by the client package 1002. Furthermore, the non-object-based return calls or callbacks 1024 to objects 1014 (e.g., FORMs, DATA objects, etc.) may be needed for having compatibility with coding from the pre-ABAP Objects era, these callback 1024 may be registered during installation or customization. The client interface 1006 may also be used by the client package 1002 to declare its callback targets for various service packages 1004 as the client package 1002 typically knows both the service package 1004 and its callback targets.

Figure 11:
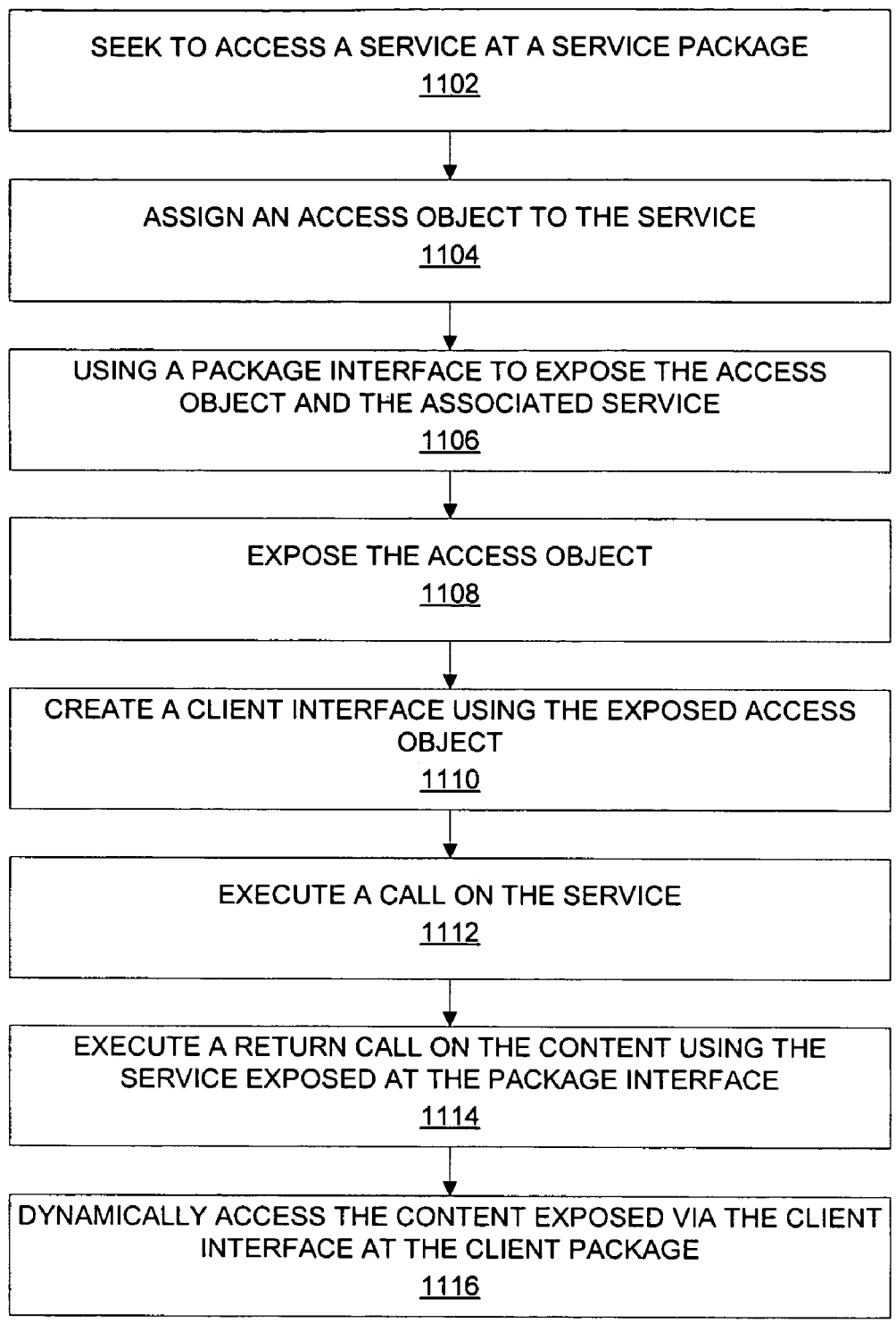
FIG. 11 illustrates an embodiment of a process for executing calls and return calls using client interfaces in a package environment.

FIG. 11 illustrates an embodiment of a process for executing calls and return calls using client interfaces in a package environment. In one embodiment, a client package seeks to call a service (e.g., function) at a service package at processing block 1102. At the service package, an access object is assigned to that service at processing block 1104. The access object is to be exposed, and ultimately the associated service is also to be exposed using a package interface at the service package at processing block 1106. At processing block 1108, the access object is exposed. The exposed access object is then referred to by the client package when created a client interface at processing block 1110. The client interface is used to expose the content (e.g., PROG) having objects (e.g., FORM) at the client package.

A call is executed on the service at processing block 1112. The objects that call the service are not necessarily exposed at the client interface. Just those objects of the service that are called back by the service are to be exposed through the client interface. A return call is executed on the content at the client package by the service at the service package using the client interface at the client package at processing block 1114. At processing block 1116, the content at the client package is dynamically accessed by the service at the service package using the client interface at the client package. It is to be noted that executing a return call/call back is not a different step from dynamically accessing the content of the client interface. A callback is regarded a special form of dynamically accessing content of the client interface. Dynamically accessing refers to using some objects where it is decided shortly before the actual access which objects are to be used, or in which way they are to be used. Referring to FIG. 5, in the main program, it is known which service (FM1) the program uses, so it can be written down during development. This is static access. On function module FM1, the callback target is not written down, because there might be any number of clients that may have different (and changing) callback targets. The main program passes the actual callback target to the service, which makes it known just a short time before the callback actually takes place. Another client that calls the service a short time later sets another target, so that the same call function statement in function module FM1 calls a different function module. This is dynamic access. ABAP is capable of various kinds of dynamic accesses, such as it is possible to deal with data structures whose exact type/structure (e.g., number fields of the structure, name of the nth field, whether the structure stores a number or some text, etc.) is known not during development, but shortly before accessing the structure.

The architectures and methodologies discussed above may be implemented with various types of computing systems such as an application server that includes a J2EE server that supports Enterprise Java Bean ("EJB") components and EJB containers (at the business layer) and/or Servlets and Java Server Pages ("JSP") (at the presentation layer). Of course, other embodiments may be implemented in the context of various different software platforms including, by way of example, Microsoft.NET, Windows/NT, Microsoft Transaction Server (MTS), ABAP platforms developed by SAP AG, and comparable platforms.

Figure 12:
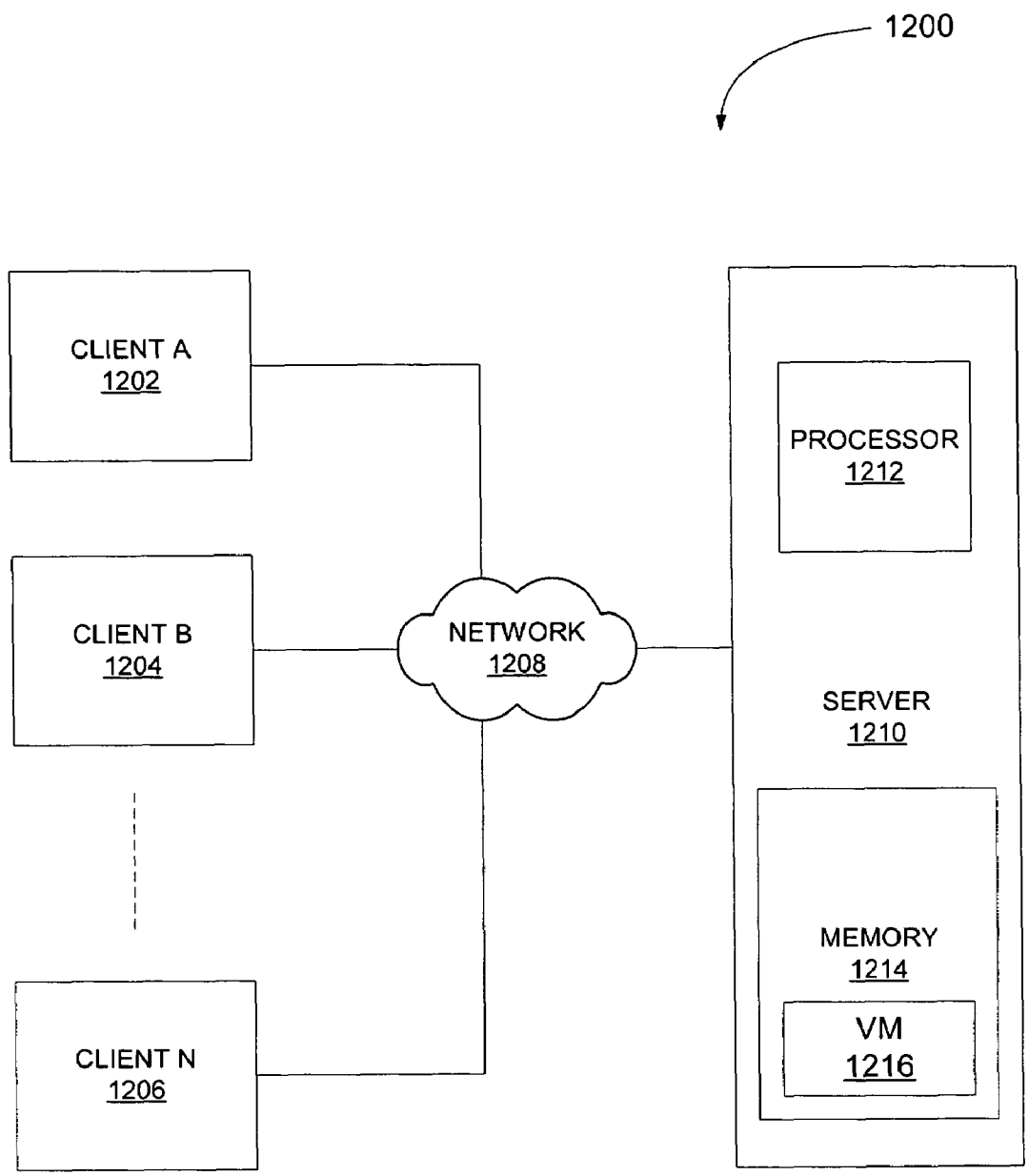
FIG. 12 illustrates an exemplary client/server system used in implementing one or more embodiments of the invention.

FIG. 12 illustrates an exemplary client/server system 1200 used in implementing one or more embodiments of the invention. In the illustrated embodiment, a network 1208 links a server 1210 with various client systems A-N 1202-1206. The server 1210 is a programmable data processing system suitable for implementing apparatus, programs, or methods in accordance with the description. The server 1210 provides a core operating environment for one or more runtime systems that process user requests. The server 1210 includes a processor 1212 and a memory 1214. The memory 1214 can be used to store an operating system a Transmission Control Protocol/Internet Protocol (TCP/IP) stack for communicating over the network 1208, and machine-executable instructions executed by the processor 1212. In some implementations, the server 1210 can include multiple processors, each of which can be used to execute machine-executable instructions.

The memory 1214 can include a shared memory area that is accessible by multiple operating system processes executing at the server 1210. An example of a suitable server to be implemented using the client/server system 1200 may include J2EE compatible servers, such as the Web Application Server developed by SAP AG of Walldorf, Germany, or the WebSphere Application Server developed by International Business Machines Corp. (IBM) of Armonk, N.Y.

Client systems 1202-1206 are used to execute multiple applications or application interfaces. Each instance of an application or an application interface can constitute a user session. Each user session can generate one or more requests to be processed by the server 1210. The requests may include instructions or code to be executed on a runtime system (e.g., the VM 1216) on the server 1210. A VM 1216 is an abstract machine that can include an instruction set, a set of registers, a stack, a heap, and a method area, like a real machine or processor. A VM 1216 essentially acts as an interface between program code and the actual processor or hardware platform on which the program code is to be executed. The program code includes instructions from the VM instruction set that manipulates the resources of the VM 1216.

Figure 13:
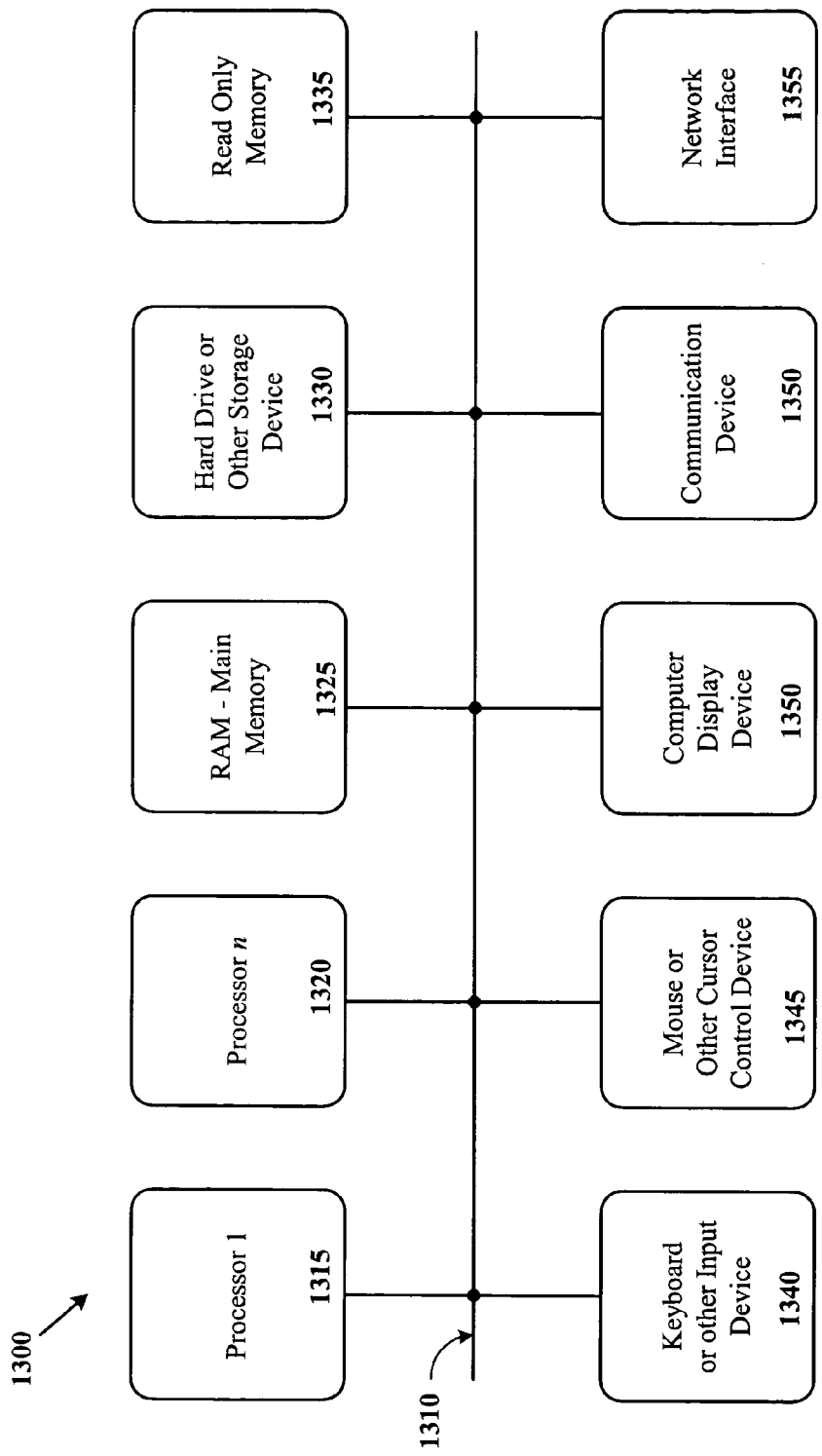
FIG. 13 is an exemplary computer system used in implementing one or more embodiments of the invention.

FIG. 13 is an exemplary computer system 1300 used in implementing an embodiment of the present invention. In this illustration, a system 1300 comprises a bus 1310 or other means for communicating data. The system 1300 includes one or more processors, illustrated as shown as processor 1 1315 through processor n 1320 to process information. The system 1300 further comprises a random access memory (RAM) or other dynamic storage as a main memory 1325 to store information and instructions to be executed by the processor 1315 through 1320. The RAM or other main memory 1325 also may be used for storing temporary variables or other intermediate information during execution of instructions by the processors 1315 through 1320.

A hard drive or other storage device 1330 may be used by the system 1300 for storing information and instructions. The storage device 1330 may include a magnetic disk or optical disc and its corresponding drive, flash memory or other non-volatile memory, or other memory device. Such elements may be combined together or may be separate components. The system 1300 may include a read only memory (ROM) 1335 or other static storage device for storing static information and instructions for the processors 1315 through 1320.

A keyboard or other input device 1340 may be coupled to the bus 1310 for communicating information or command selections to the processors 1315 through 1320. The input device 1340 may include a keyboard, a keypad, a touch-screen and stylus, a voice-activated system, or other input device, or combinations of such devices. The computer may further include a mouse or other cursor control device 1345, which may be a mouse, a trackball, or cursor direction keys to communicate direction information and command selections to the processors and to control cursor movement on a display device. The system 1300 may include a computer display device 1350, such as a cathode ray tube (CRT), liquid crystal display (LCD), or other display technology, to display information to a user. In some environments, the display device may be a touch-screen that is also utilized as at least a part of an input device. In some environments, the computer display device 1350 may be or may include an auditory device, such as a speaker for providing auditory information.

A communication device 1350 may also be coupled to the bus 1310. The communication device 1350 may include a modem, a transceiver, a wireless modem, or other interface device. The system 1300 may be linked to a network or to other device using via an interface 1355, which may include links to the Internet, a local area network, or another environment. The system 1300 may comprise a server that connects to multiple devices. In one embodiment the system 1300 comprises a Java® compatible server that is connected to user devices and to external resources.

While the machine-readable medium 1330 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1300 and that causes the machine to perform any one or more of the methodologies of the present invention. The term "machine-readable medium" shall accordingly be taken to include, but not be limited to, solid-state memories, optical and magnetic media, and carrier wave signals.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD-ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Furthermore, it is appreciated that a lesser or more equipped computer system than the example described above may be desirable for certain implementations. Therefore, the configuration of system 1300 may vary from implementation to implementation depending upon numerous factors, such as price constraints, performance requirements, technological improvements, and/or other circumstances.

It is noted that processes taught by the discussion above can be practiced within various software environments such as, for example, object-oriented and non-object-oriented programming environments, Java based environments (such as a J2EE environment, or environments defined by other releases of the Java standard), or other environments (e.g., a .NET environment, a Windows/NT environment each provided by Microsoft Corporation).

It should be noted that, while the embodiments described herein may be performed under the control of a programmed processor, such as processors 1315 through 1320, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:
    locating an access object assigned to a first service of a service package at a service computer system, the service including a call to access a content of a client package at a client computer system that is coupled to the service computer system, wherein
        the access object is accessible to the client package via a service interface,
        the content of the client package is accessible via the access object,
        the call included in the service identifies a second service of the service package inaccessible to the client package via the service interface and the client package interface, and
        the client package includes a dependency control list and a dependency log of objects used by the client package, the dependency control list to control access to the client package interface, and the dependency log to log static and dynamic uses of objects;
    accessing the content of the client package via the access object;
    calling, via the content of the client package, the call included in the service; and
    return calling, by the service call of the service, the content of the client package to establish a dynamic connection between the client package and the second service of the service package.

2. The method of claim 1, further comprising:
assigning an additional service package to the access object, wherein the service package and the additional service package include a list of objects assigned to each respective service package; and
aggregating the lists of the service packages assigned to the access object.

3. The method of claim 2, further comprising exposing the access object to the client package.

4. The method of claim 1, further comprising:
creating the client interface at the client package using the access object.

5. A system comprising:
means for locating an access object assigned to a first service of a service package at a service computer system, the service including a call to access a content of a client package at a client computer system that is coupled to the service computer system, wherein
the access object is accessible to the client package via a service interface,
the content of the client package is accessible via the access object,
the call included in the service identifies a second service of the service package inaccessible to the client package via the service interface and the client package interface, and
the client package includes a dependency control list and a dependency log of objects used by the client package, the dependency control list to control access to the client package interface, and the dependency log to log static and dynamic uses of objects;
means for accessing the content of the client package via the access object;
means for calling, via the content of the client package, the call included in the service; and
means for return calling, by the service call of the service, the content of the client package to establish a dynamic connection between the client package and the second service of the service package.

6. The system of claim 5, further comprising:
means to assign an additional service package to the access object, wherein the service package and the additional service package include a list of objects assigned to each respective service package; and
means to aggregate the lists of the service packages assigned to the access object.

7. The system of claim 6, further comprising means to expose the access object to the client package.

8. The system of claim 5, wherein the client package is further to:
create the content interface at the client package using the access object.

9. A machine-readable storage medium having stored thereon data representing sets of instructions which, when executed by a machine, cause the machine to:
locate an access object assigned to a first service of a service package at a service computer system, the service including a call to access a content of a client package at a client computer system that is coupled to the service computer system, wherein
the access object is accessible to the client package via a service interface,
the content of the client package is accessible via the access object,
the call included in the service identifies a second service of the service package inaccessible to the client package via the service interface and the client package interface, and
the client package includes a dependency control list and a dependency log of objects used by the client package, the dependency control list to control access to the client package interface, and the dependency log to log static and dynamic uses of objects;
accessing the content of the client package via the access object;
call, via the content of the client package, the call included in the service; and
return call, by the service call of the service, the content of the client package to establish a dynamic connection between the client package and the second service of the service package.

10. The machine-readable storage medium of claim 9, wherein the sets of instructions which, when executed by the machine, cause the machine to:
assign an additional service package to the access object, wherein the service package and the additional service package include a list of objects assigned to each respective service package; and
aggregate the lists of the service packages assigned to the access object.

11. The machine-readable storage medium of claim 9, wherein the sets of instructions which, when executed by the machine, cause the machine to:
create the content interface at the client package using the access object.

12. The machine-readable storage medium of claim 9, wherein the sets of instructions which, when executed by the machine, cause the machine facilitate the client package to request the service at the service package.

* * * * *

UNITED STATES PATENT AND TRADEMARK OFFICE
CERTIFICATE OF CORRECTION

PATENT NO.       : 7,587,705 B2                                              Page 1 of 1
APPLICATION NO. : 11/118739
DATED            : September 8, 2009
INVENTOR(S)      : Benjes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1032 days.

Signed and Sealed this

Twenty-first Day of September, 2010

David J. Kappos
*Director of the United States Patent and Trademark Office*